United States Patent Office 3,600,324
Patented Aug. 17, 1971

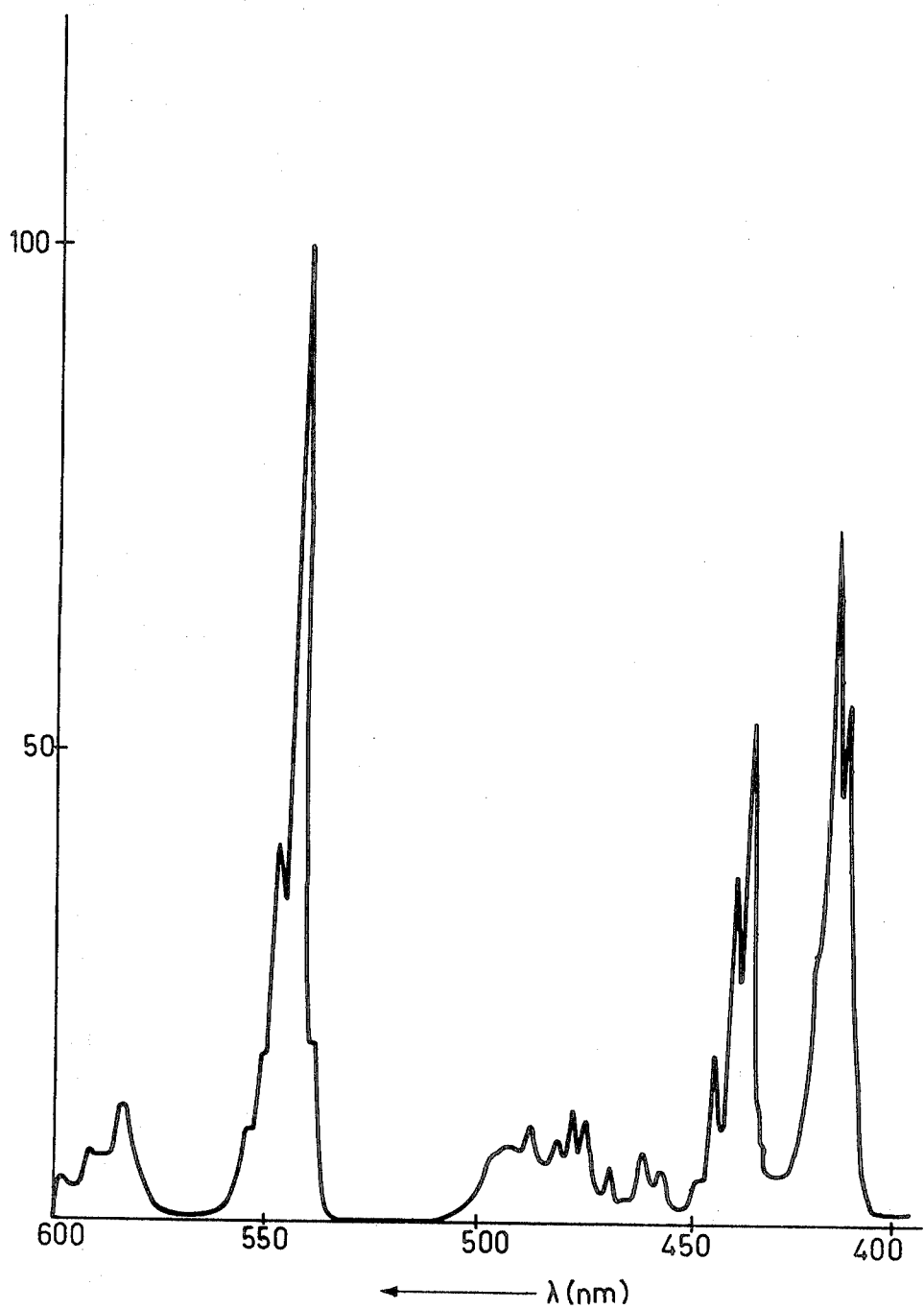

3,600,324
TERBIUM ACTIVATED STRONTIUM ORTHO-PHOSPHATE PHOSPHOR
Alfred Bril and Willem Lambertus Wanmaker, Emmasingel, Eindhoven, Netherlands, assignors to U.S. Philips Corporation, New York, N.Y.
Filed Dec. 23, 1968, Ser. No. 785,911
Claims priority, application Netherlands, Dec. 22, 1967, 6717638
Int. Cl. C09k 1/36
U.S. Cl. 252—301.4P
2 Claims

ABSTRACT OF THE DISCLOSURE

Terbium activated strontium orthophosphate luminescent material useful as a phosphor in television receiver picture tubes.

---

The invention relates to a luminescent screen comprising a luminescent strontium orthophosphate activated by trivalent terbium and to a cathode ray tube provided with such a screen. Furthermore the invention relates to a luminescent strontium orthophosphate activated by trivalent terbium.

Strontium orthophosphate may have two structures, namely the $\alpha$ phase which is stable below a temperature of approximately 1300 °C. and the $\beta$ phase which is stable above said temperature. Thus, at normal temperature the pure strontium orthophosphate will have the $\alpha$ structure.

It is known from French patent specification No. 1,422,-202 that strontium orthophosphate in which the strontium is partly substituted for magnesium, zinc, calcium, cadmium or aluminium can be activated by terbium and by copper. It is also known from British patent specification No. 882,347 that strontium orthophosphate can be activated by terbium, copper and tin.

The substances known from these patent specifications have the structure of $\beta$-strontium orthophosphate, even at low temperatures as a result of the partial substitution of the strontium for elements having a smaller ion radius than the strontium. In substances of the said British patent specification part of the strontium ions has been substituted with terbium ions.

Luminescent substances activated by terbium may generally be excited by ultraviolet radiation and by electrons. The visible radiation then emitted has a spectral distribution comprising a high emission peak in the green part of the spectrum and is characteristic of the terbium. In some terbium-activated substances a blue violet terbium emission has been observed. The luminescent phosphates mentioned in the patent specifications referred to above may satisfactorily be excited by ultraviolet radiation and then show an emission spectrum having lines in the green part of the spectrum at approximately 490 and 540 nm. and at still longer wavelengths; the blue violet terbium emission (at approximately 415 and 435 nm.) is, however, entirely absent.

From investigations which have led to the present invention it has been found that terbium-activated strontium orthophosphates having the $\beta$ structure such as the said known phosphates are satisfactory luminescent substances when excited by ultraviolet radiation only. When excited by electrons the energy conversion efficiency is very small. On the other hand it has been found that the reverse applies for the terbium-activated strontium orthophosphates having the $\alpha$ structure: the energy conversion efficiency is large on excitation by electrons, whereas the light output is small upon excitation by ultraviolet radiation.

A luminescent screen for electron excitation according to the invention comprises a luminescent strontium orthophosphate activated by trivalent terbium and is characterized in that the luminescent phosphate satisfies the formula $$Sr_{3-1.5x}Tb_x(PO_4)_2$$

wherein $0.01 \leq x \leq 0.50$ and that the luminescent phosphate had the structure of $\alpha$ strontium orthophosphate.

A luminescent substance which satisfies the above defined formula and which has the said $\alpha$ structure may satisfactorily be excited by electrons and then shows an emission spectrum having strong lines both in the blue violet part of the spectrum at approximately 415 and 435 nm. and in the green part.

The luminescent substances according to the invention have the advantage of a long decay time. A long decay time is desirable in cathode-ray tubes for picture display if flicker of the pictures is to be reduced. Flicker occurs when the decay time of the luminescent substance is much shorter than the period during which a picture is scanned by the electron beam on the screen and then particularly in the bright parts of the picture. (See J. Haantjes and F. W. de Vrijer, Wireless Engineer, 28, 40 (1951).)

Flicker is particularly disturbing when using cathode ray tubes as so-called monitor tubes which are used in control rooms of television studios. Here a number of such tubes is arranged in one another's vicinity. When observing a monitor tube light from the tubes arranged beside said monitor tube is incident on the corners of the observer's eyes. As is known exactly the corners of the eye are very sensitive to flicker phenomena. Until now luminescent substances of the sulphide type have been used in these tubes, which substances have a decay time of approximately 30–50/$\mu$sec. which is much shorter than the picture period (16–20 msec.). The luminescent substances according to the invention have a decay time of approximately 3.5 msec. and provide the possibility of reducing flicker in cathode-ray tubes for picture display to a minimum.

It is to be noted that no efficient blue emitting luminescent substances of a long decay time have been known until the present invention.

A further advantage of the luminescent substances according to the invention is the bluish white emission colour so that it is not necessary to mix the substances with other luminescent substances in order to obtain white light.

The terbium content may be varied within the above given limits. Values of $x$ between 0.03 and 0.40 are, however, preferred because then the highest energy conversion efficiencies of the radiation are obtained, as will be apparent hereinafter.

The invention will now be described with reference to two tables, one example and one drawing.

TABLE I

| I | II | III | | IV | V |
|---|---|---|---|---|---|
| Example | Formula | Composition firing mixture in gms. | | | Energy conversion efficiency |
| 1 | $Sr_{2.985}Tb_{0.01}(PO_4)_2$ | $SrHPO_4$ | 8.06 | | 3.5 |
|   |   | $SrCO_3$ | 3.24 | | |
|   |   | $TbPO_4$ | 0.056 | | |
| 2 | $Sr_{2.94}Tb_{0.04}(PO_4)_2$ | $SrHPO_4$ | 7.93 | | 6 |
|   |   | $SrCO_3$ | 3.19 | | |
|   |   | $TbPO_4$ | 0.224 | | |
| 3 | $Sr_{2.88}Tb_{0.08}(PO_4)_2$ | $SrHPO_4$ | 7.75 | | 8 |
|   |   | $SrCO_3$ | 3.11 | | |
|   |   | $TbPO_4$ | 0.446 | | |
| 4 | $Sr_{2.685}Tb_{0.21}(PO_4)_2$ | $SrHPO_4$ | 7.17 | | 7 |
|   |   | $SrCO_3$ | 2.88 | | |
|   |   | $TbPO_4$ | 1.163 | | |
| 5 | $Sr_{2.46}Tb_{0.36}(PO_4)_2$ | $SrHPO_4$ | 6.51 | | 5 |
|   |   | $SrCO_3$ | 2.62 | | |
|   |   | $TbPO_4$ | 1.975 | | |

EXAMPLE

A mixture was prepared of the substance indicated in column III of Table I in the quantities indicated in column IV. This mixture was heated at 1100–1300° C. for 2 hours. After cooling of the fired product obtained it was ground and again heated at 1100–1300° C. for 2 hours. In both cases the heat treatment preferably took place in a non-oxidizing atmosphere. For example, a quantity of fine-grained carbon may be provided in the vicinity of the firing mixture. After cooling subsequent to the second heat treatment the reaction product obtained was ground and sieved, if necessary. It was then ready for use.

Column V of Table I states the energy conversion efficiency in percents upon excitation by electrons at an energy of 20 kev.

TABLE II

| X | Energy conversion efficiency | | |
|---|---|---|---|
| | Total | Blue-violet | Green |
| 0.01 | 3.5 | 2.5 | 1 |
| 0.02 | 4 | 3 | 1 |
| 0.04 | 6 | 4.5 | 1.5 |
| 0.12 | 6.5 | 5 | 1.5 |
| 0.15 | 6.5 | 4.5 | 2 |
| 0.21 | 7 | 5 | 2 |
| 0.24 | 6 | 4 | 2 |

Table II shows the dependence of the energy conversion efficiency on the terbium content $x$. The values of the energy efficiency of the conversion into blue violet and into green radiation and the total efficiency are stated separately. It is clearly apparent that the highest energy conversion efficiencies are obtained for values of $x$ between 0.03 and 0.40.

The drawing shows the emission spectrum of the substance according to Example 3 of Table I when excited by electrons at an energy of 20 kev. The radiation energy per constant wavelength interval is plotted in arbitrary units on the ordinate, the maximum radiation energy being fixed at 100. The wavelength of the emitted radiation is plotted in nm. on the abscissa. The emission spectra of the other substances according to the invention do not substantially deviate from the curve shown in the drawing. The graph shows that a great part of the emission lies in the blue violet part of the spectrum having maxima at 415 and 435 nm. Radiation is also emitted in the green and in the yellow part of the spectrum. As a result the emission colour observed is bluish white.

What we claim is:

1. A luminescent strontium orthophosphate activated by trivalent terbium and corresponding to the formula:

$$Sr_{3-1.5x}Tb_x(PO_4)_2$$

wherein $0.01 \leq x \leq 0.50$ said orthophosphate having the structure of a strontium orthophosphate and being particularly adapted for use in cathode ray tubes.

2. The luminescent strontium orthophosphate of claim 1 wherein $0.03 \leq x \leq 0.40$.

References Cited

UNITED STATES PATENTS

| 3,025,423 | 3/1962 | Rimbach | 252—301.4P |
| 3,488,292 | 1/1970 | McAllister | 252—301.4P |

ROBERT D. EDMONDS, Primary Examiner

PO-1050
(5/69)

UNITED STATES PATENT OFFICE
CERTIFICATE OF CORRECTION

Patent No. 3,600,324 (PHN 2954) Dated August 17, 1971

Inventor(s) ALFRED BRIL ET AL

It is certified that error appears in the above-identified patent and that said Letters Patent are hereby corrected as shown below:

Column 4, line 21, "a strontium" should be

-- α strontium --.

Signed and sealed this 27th day of June 1972.

(SEAL)
Attest:

EDWARD M. FLETCHER, JR.
Attesting Officer

ROBERT GOTTSCHALK
Commissioner of Patents